UNITED STATES PATENT OFFICE.

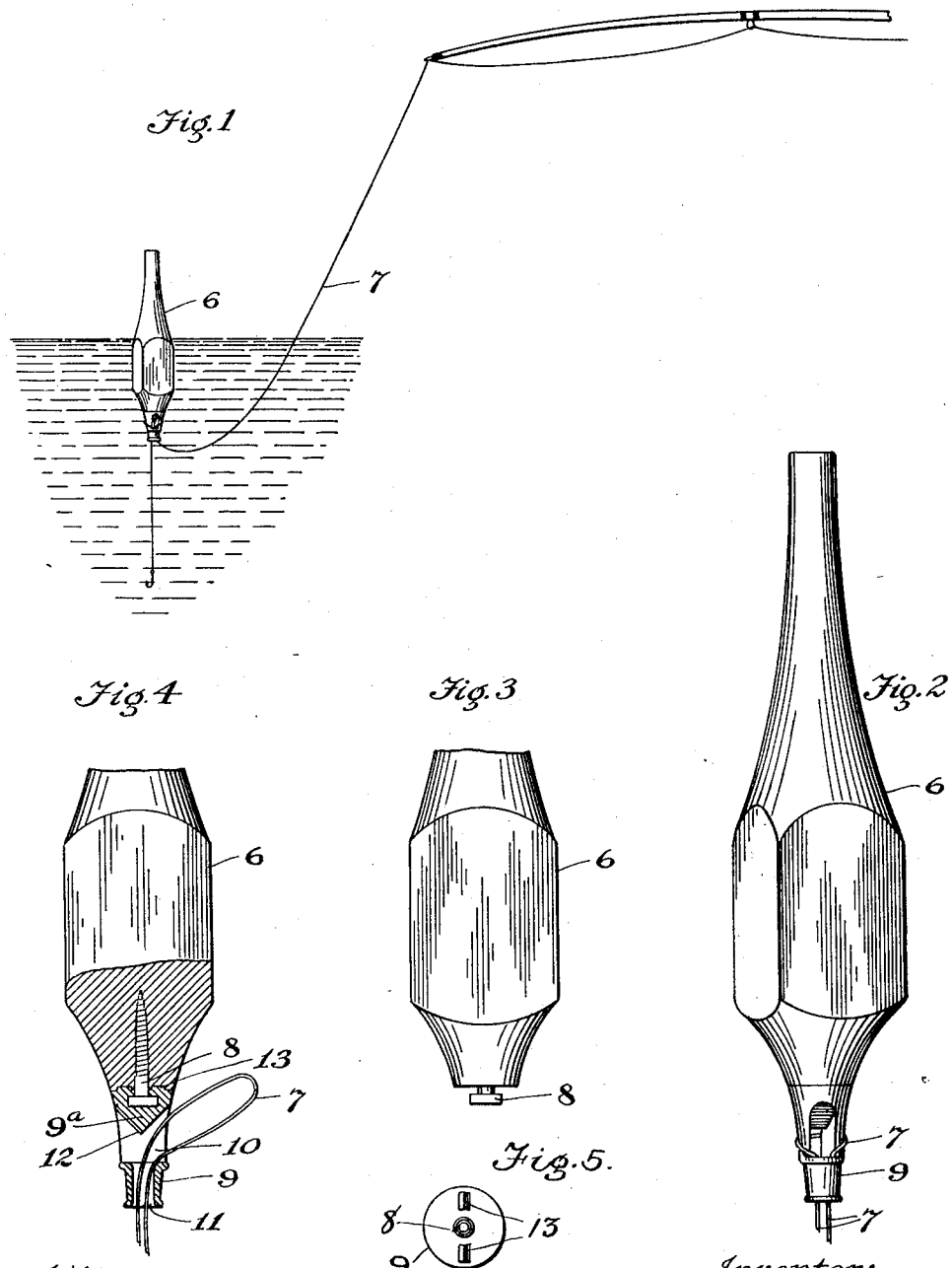

WILLIAM F. ANTHONY, OF CLEVELAND, OHIO.

FISHING-FLOAT.

1,112,049.  Specification of Letters Patent.  Patented Sept. 29, 1914.

Application filed April 1, 1914. Serial No. 828,889.

*To all whom it may concern:*

Be it known that I, WILLIAM F. ANTHONY, a citizen of the United States, residing at Cleveland, in the county of Cuyahoga and State of Ohio, have invented certain new and useful Improvements in Fishing-Floats, of which the following is a specification.

This invention relates to fishing floats, and has for its object to provide an improved attachment for the float, by means of which the line may be fastened thereto, in such a manner that the float may be easily adjusted to desired position along the line, and with which it is difficult or impossible for the line to become tangled. The attachment permits the connection of the line to one end of the float only, and it can be applied to any wooden or cork float, regardless of its style or shape. The line connection being on the lower end of the float, only, will permit the float to revolve in the water when live bait is used, and thereby release the bait or cross line from the main line. This is not possible with the line attached to both ends of the float, in which event, when live minnows swim over the main line, the lines become so tangled, that it is often necessary to cut the line. The float may be adjusted instantly according to the depth desired, without removing the float from the line.

The invention is illustrated in the accompanying drawings, in which:—

Figure 1 is a side view illustrating the manner of use. Fig. 2 is an enlarged view of the float and the attachment and the line secured thereto. Fig. 3 is a side view of a float showing a screw by means of which the attachment is fixed to the end of the float. Fig. 4 is a sectional view illustrating the manner of securing the float in desired position on the line. Fig. 5 is an inner end view of the attachment.

Referring specifically to the drawings, 6 indicates the float, which may be of any suitable size or shape, and 7 the fishing line. The attachment 9 is fixed to the end of the float by means of a screw 8 the head of which is embedded in the base 9ª of the attachment, which is preferably a small piece of cast metal. The body has a cross passage 10 extending through the same from side to side and communicating with a longitudinal passage 11 at the lower end, and with a V-shaped projection 12 on the upper side of the opening 10 to guide the bight of the line when it is inserted through the tube 11 to one side or the other of the float. The body of the attachment is preferably cast on the head of the screw, and the inner end or base of the attachment has teeth or projections 13, which, when the screw is driven in, bite into the wood or cork and prevent it from becoming unscrewed.

In the use of the device the bight of the line 7 is inserted through the passages in the attachment and pulled out on one side thereof, as shown in Fig. 4. The loop is then passed over the top of the float and pulled down tight on the other side, to the position shown in Figs. 1 and 2. The float will then stand upright and is free to turn as the bait moves, and if the minnow swims over the main line above the float, the latter will tip over or tilt to allow the hanging line to slip over the float, and so will not be tangled. The float can be easily adjusted along the line by loosening the loop and pulling the end of the line through the opening. The weight of the attachment causes the float to normally stand upright in the water. The weight of the attachment also enables the fisherman to cast the float out into the water without the aid of any additional weight or so called lead sinker.

What I claim as new is:—

An attachment for a fishing float comprising a body 9 having a cross passage 10 and longitudinal passage 11 communicating therewith, and a projecting guide 12 in said passage 10, opposite the inner end of the passage 11.

In testimony whereof, I do affix my signature in presence of two witnesses.

WILLIAM F. ANTHONY.

Witnesses:
JOHN A. BOMMHARDT,
J. B. DAVIS.